(12) United States Patent
Verman et al.

(10) Patent No.: US 7,280,634 B2
(45) Date of Patent: *Oct. 9, 2007

(54) BEAM CONDITIONING SYSTEM WITH SEQUENTIAL OPTIC

(75) Inventors: Boris Verman, Bloomfield, MI (US); Jimpei Harada, Tokyo (JP)

(73) Assignee: Osmic, Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/449,208

(22) Filed: Jun. 8, 2006

(65) Prior Publication Data

US 2006/0239405 A1   Oct. 26, 2006

Related U.S. Application Data

(63) Continuation-in-part of application No. 10/866,057, filed on Jun. 10, 2004, now Pat. No. 7,076,026.

(60) Provisional application No. 60/478,460, filed on Jun. 13, 2003.

(51) Int. Cl.
*G21K 1/06* (2006.01)

(52) U.S. Cl. .................. 378/85; 378/145

(58) Field of Classification Search .................. 378/70, 378/71, 84, 85, 145, 147
See application file for complete search history.

(56) References Cited

U.S. PATENT DOCUMENTS

| | | | |
|---|---|---|---|
| 2,941,078 A | 6/1960 | Montel | 378/70 |
| 4,174,478 A | 11/1979 | Franks | 378/36 |
| 4,242,588 A | 12/1980 | Silk et al. | 378/34 |
| 4,525,853 A | 6/1985 | Keem et al. | 378/84 |
| 4,958,363 A | 9/1990 | Nelson et al. | 378/85 |
| 5,027,377 A | 6/1991 | Thoe | 378/145 |
| 5,259,013 A | 11/1993 | Kuriyama et al. | 378/43 |
| 5,604,782 A | 2/1997 | Cash, Jr. | 378/85 |
| 5,799,056 A | 8/1998 | Gutman | 378/84 |
| 6,014,423 A | 1/2000 | Gutman et al. | 378/85 |
| 6,041,099 A | 3/2000 | Gutman et al. | 378/85 |
| 6,330,301 B1 | 12/2001 | Jiang | 378/85 |
| 6,493,421 B2 | 12/2002 | Gutman | 378/84 |
| 7,076,026 B2 * | 7/2006 | Verman et al. | 378/85 |
| 2003/0108153 A1 | 6/2003 | Lange et al. | 378/85 |

(Continued)

FOREIGN PATENT DOCUMENTS

DE   299 24 462 U1   7/2003

(Continued)

OTHER PUBLICATIONS

XP-002104740—X-Ray Microscope With Multilayer Mirrors—J. Underwood; T. Barbee & C. Frieber—Applied Optics— vol. 25, No. 11 -Jun. 1, 1986.

(Continued)

*Primary Examiner*—Courtney Thomas
(74) *Attorney, Agent, or Firm*—Brinks Hofer Gilson & Lione

(57) ABSTRACT

An x-ray beam conditioning system with a first diffractive element and a second diffractive element. The two diffractive elements are arranged in a sequential configuration, and one of the diffractive elements is a crystal. The other diffractive element may be a multilayer optic.

13 Claims, 3 Drawing Sheets

U.S. PATENT DOCUMENTS

| | | | |
|---|---|---|---|
| 2003/0112923 A1 | 6/2003 | Lange et al. | 378/147 |
| 2004/0170250 A1 | 9/2004 | Verman et al. | 378/84 |

FOREIGN PATENT DOCUMENTS

| | | |
|---|---|---|
| EP | 0 459 833 A2 | 5/1991 |
| EP | 1 060 478 B1 | 5/2003 |
| WO | WO96/04665 | 2/1996 |
| WO | WO99/43008 | 8/1999 |
| WO | WO99/43009 | 8/1999 |
| WO | WO 00/62306 | 10/2000 |
| WO | WO01/09904 | 2/2001 |

OTHER PUBLICATIONS

XP-002104741—Medium-Sized Grazing Incidence High-Energy X-Ray Telescopes Employing Continuously Graded Multilayers—K. Joensen; C. Schnopper; G. Gorenstein; J. Susini; J. Wood; K. Parker—SPIE vol. 1736 X-Ray Detector Physics and Applications (1992)—239.

XP-002104742—GeoCARS Microfocusing Kirkpatrick-Baez Mirror Bender Development—M. Rivers; W. Schildkamp; P. Eng—1995 American Institute of Physics.

Improved Prompt Gamma Neutron Activation Analysis Facility Using a Focused Diffracted Neutron Beam—1998 Elsevier Science B.V., Nuclear Instruments and Methods in Physics Research B 143 (1998) 414-421.

X-Ray Microscopy, V.E. Cosslet; W.C. Nixon, Cambridge At The University Press, 1960, pp. 107-110, p. 396.

Encyclopedia of Physics, S. Flügge, vol. XXX, X-Rays; Springer-Verlag, Berlin, Gottingen, Heidelberg, 1957, p. 325, p. 336.

Recent Developments of Multilayer Mirror Optics for Laboratory X-Ray Instrumentation—C. Michaelsen; J. Wiesmann; C. Hoffmann; K. Wulf; L. Brügemann; A. Storm; INCOATEC GmbH and GKSS Research Center, Max-Planck-Str., 21502 Geesthacht, Germany, Bruker AXS GmbH, Östl. Rheinbrückenstr. 49, 76187 Karlsruhe, Germany, Bruker Nonius BV, Oostingel 209, 2612 HL Delft, The Netherlands.

The X-Ray Microscope with Catamegonic Roof-Shaped Objective; M. Montel, Laboratoire de Chimie Physique de la Faculté des Schiences, Université de Paris, Paris, France, pp. 177-185.

Theory of Image Formation In Combinations of X-Ray Focussing Mirrors, Y.T. Thathachari, Department of Physics, Indian Institute of Science, Bangalore-3, Sep. 6, 1952, pp. 41-62.

Optical Systems For Soft X-Rays; Alan G. Michette; pp. 52-65.

XP-000280838—Kirkpatrick-Baez Microprobe on the Basis of Two Linear Single Crystal Bragg-Fresnel Lenses, U. Bonse, C. Riekel, A. A. Snigirev, Review of Scientific Instruments, American Institute of Physics, New York, US. vol. 63, No. 1 PT 2A, 1992, pp. 622-624.

XP-002289276—Microfocusing Source and Multilayer Optics Based X-Ray Diffraction Systems, Boris Verman, Licai Jiang and Bonglea Kim, The Rigaku Journa, vol. 19, No. 1, 2002, pp. 4-13.

XP-009039739—Basic Principle and Performance Characteristics of Multilayer Beam Conditioning Optics, Licia Jiang, Zaid Al-Mosheky, and Nik Grupido, vol. 17, No. 2, Jun. 2002 pp. 81-93.

XP-001203751—Diffractive Optics Bend, Shape and Filter X-Ray Light—Nicola J. Grupido, and Ronald L. Remus, vol. 34, No. 3, Mar. 1998, pp. 115-117.

E. Ziegler, O. Hignette, Ch. Morawe, R. Tucoulou, High-efficiency turnable X-ray focusing optics using mirrors and laterally-graded multilayers, Nuclear Instruments and Methods in Physics Research, A 467-468, 2001, pp. 954-957.

Y. Suzuki, F. Uchida, Hard x-ray microprobe with total-reflection mirrors, Rev. Sci. Instrum. 63 (1), Jan. 1992, pp. 578-581.

P. Dhez, P. Chevallier, T.B. Lucatorto, C. Tarrio, Review Article, Instrumental aspects of x-ray microbeams in the range above 1 keV, Review of Scientific Instruments, vol. 70, No. 4, Apr. 1999, pp. 1907-1920.

P. Chevallier, P. Dhez, A. Erko, A. Firsov, F. Legrand, P. Populus, X-ray microbrobes, Nuclear Instruments and Methods in Physics Research B 113, 1996, pp. 122-127.

G.E. Ice, Jin-Seok Chung, W. Lowe, E. Williams, J. Edelman, Small-displacement monochromator for microdiffraction experiments, Review of Scientific Instruments, vol. 71, No. 5, May 2000, pp. 2001-2006.

P. Dhez, A. Erko, E. Khzmalian, B. Vidal, V. Zinenko, Kirkpatric-Baez microscope based on a Bragg-Fresnel x-ray multilayer focusing system, Applied Optics, vol. 31, No. 31, Nov. 1, 1992, pp. 6662-6667.

\* cited by examiner

BEAM CONDITIONING SYSTEM WITH SEQUENTIAL OPTIC

RELATED APPLICATION

This application is a continuation-in-part of U.S. patent application Ser. No. 10/866,057, filed Jun. 10, 2004, now U.S. Pat. No. 7,076,026, which claims the benefit of U.S. Provisional Application No. 60/478,460, filed Jun. 13, 2003.

The entire contents of the above applications are incorporated herein by reference.

BACKGROUND

The present invention relates generally to an x-ray optical system for conditioning an x-ray beam. More particularly, the present invention relates to a optical system for reflecting an x-ray beam in two directions.

There are a number of x-ray applications that require the use of a two-dimensional conditioned x-ray beam. For example, medical radiotherapy systems utilize x-ray beams to destroy cancerous tissue, x-ray diffraction or microdiffraction analysis systems channel x-ray radiation at a sample crystal generating a diffraction pattern indicative of a lattice structure, and x-ray fluorescence and spectroscopy systems employ directed and conditioned x-ray beams.

A Kirkpatrick-Baez optical configuration has been proposed to reflect an x-ray beam in two directions independently. In the Kirkpatrick-Baez configuration, at least two optical elements are oriented sequentially so that their meridian axes are perpendicular. Using two parabolic optical elements, a Kirkpatrick-Baez system is capable of capturing radiation from a point source and collimating it into a parallel beam. Equipped with elliptical optics, a Kirkpatrick-Baez system reflects a perfect point image with a point source at its focal point.

More recent developments in the fabrication of multilayer reflective optics have led to further developments in the Kirkpatrick-Baez-type optical systems. For example, a modified Kirkpatrick-Baez system, including the use of sequentially ordered multilayer optics, have been proposed for of inertial confinement fusion.

Although the use of multilayer mirrors in a Kirkpatrick-Baez configuration provides increased efficiency, this type of system is not optimal because mirrors positioned at different distances from the source have different capture angles (i.e., a mirror positioned further from the source has lower efficiency), and, additionally, the beam convergence and image size are different in two planes, resulting in a phenomenon known as anamorphotism.

To improve efficiency and combat anamorphotism, a proposed confocal optical system employs a pair of multilayer mirrors assembled in a side-by-side configuration. The side-by-side Kirkpatrick-Baez multilayer optic is optimal for applications demanding a beam with low convergence. However, there are other applications which tolerate a higher beam convergence or in which convergence is not limited at all. Examples of such applications include micro x-ray fluorescence analysis (MXRF) and medical radiotherapy systems utilizing a convergence x-ray beam to destroy cancerous tissue. These applications demand a high flux, but a multilayer optic has limited capabilities to provide a high capture angle because of its relatively large d-spacing.

Crystals are also capable of reflecting x-rays. Their natural periodic structure, as well as that of multilayer structures, diffracts x-ray according to Bragg's equation $$n\lambda = 2d \sin \theta, \qquad (1)$$

where n is the integral number describing the order of reflection, $\lambda$ is the wavelength of x-rays, and d is the spatial periodicity of the lattice structure of the diffractive element. A so-called Johansson crystal provides precise focusing in the diffraction plane similar to an elliptically graded d-spacing multilayer.

It is noteworthy that crystals have much smaller d-spacing than multilayers. This allows freedom of design on their base x-ray optical elements with a high capture angle. For example, a Johansson crystal may have a theoretical capture angle up to $4\theta$.

However, crystals have several drawbacks that have heretofore limited their application in certain x-ray related fields. The narrow rocking curve (that is, the angular range over which an element can reflect a parallel beam) of a perfect crystal limits the flux the crystal can utilize from a finite size focal spot. Mosaic crystals have a modest reflectivity and a large penetration depth, which is not favorable in applications requiring sharp focusing.

Both types of crystals have a limited acceptance in the axial plane (plane perpendicular to the diffraction plane), and this acceptance drops significantly when an x-ray is not parallel to the diffraction plane. This last feature makes optical systems with two diffractive elements with small d-spacing and narrow rocking curve ineffective. These limiting factors have heretofore rendered optics having crystal combinations ineffective in particular x-ray applications.

From the above, it is seen that there exists a need for an improved x-ray optical system for conditioning an x-ray beam using crystals.

SUMMARY

The present invention provides an x-ray beam conditioning system with a first diffractive element and a second diffractive element arranged sequentially relative to the first diffractive element. One of the diffractive elements is a crystal, and the other element may be a multilayer optic.

Among other advantages, the x-ray beam conditioning system may be optimized for high-flux operations.

Other features and advantages will be apparent from the following description, and from the claims.

DETAILED DESCRIPTION

An analysis of the efficiency of various diffractive x-ray optical elements provides a basis for the understanding of the present invention. For simplicity, consider a single diffractive element with a cylindrical reflecting surface and with a capability to focus x-rays from a point source to the point image in the diffraction plane. Examples of such diffractive elements are Johansson crystals and elliptical multilayers with a proper grading of d-spacing. The capability of these optical elements to accept and redirect x-rays from a monochromatic x-ray source can be described as:

$$\epsilon = f \cdot \alpha \cdot \beta \cdot R, \quad (2)$$

where f is a factor describing from which portion of the source size a diffractive element can use radiation, $\alpha$ and $\beta$ are the acceptance angles in the diffraction and axial planes, respectively, and R is the element reflectivity.

The efficiency of the source focal spot usage f can be calculated as a convolution of a source spatial intensity distribution and a diffractive element angular acceptance. But in two extreme cases f can be presented as simple analytical expressions. If the angular size of the source $\gamma$ as seen from the diffractive element is much larger than an angular acceptance $\delta\theta$, then f can be calculated as:

$$f = \frac{\delta\theta}{\gamma}. \quad (3)$$

However, when the diffractive element angular acceptance $\delta\theta$ is much larger than an angular size of the source $\gamma$, f is equal to 1. An angular acceptance of a diffractive element is identical to its rocking curve. The angular size of the source is:

$$\gamma = \frac{F}{L}, \quad (4)$$

where F is the effective width of the source in the diffraction plane and L is the distance from the source to a diffractive element.

The angular acceptance in the diffraction plane $\alpha$ is defined by the diffractive element length l and Bragg's angle $\theta$, namely:

$$\alpha = \frac{(l \cdot \sin\theta)}{L}. \quad (5)$$

Equation (5) is a suitable expression for both Johansson crystals and elliptical multilayers. Each diffractive element has a limited acceptance in the axial plane as well, which is caused by the change of the incident angle when a ray propagates out of the diffraction plane.

Figure 1:
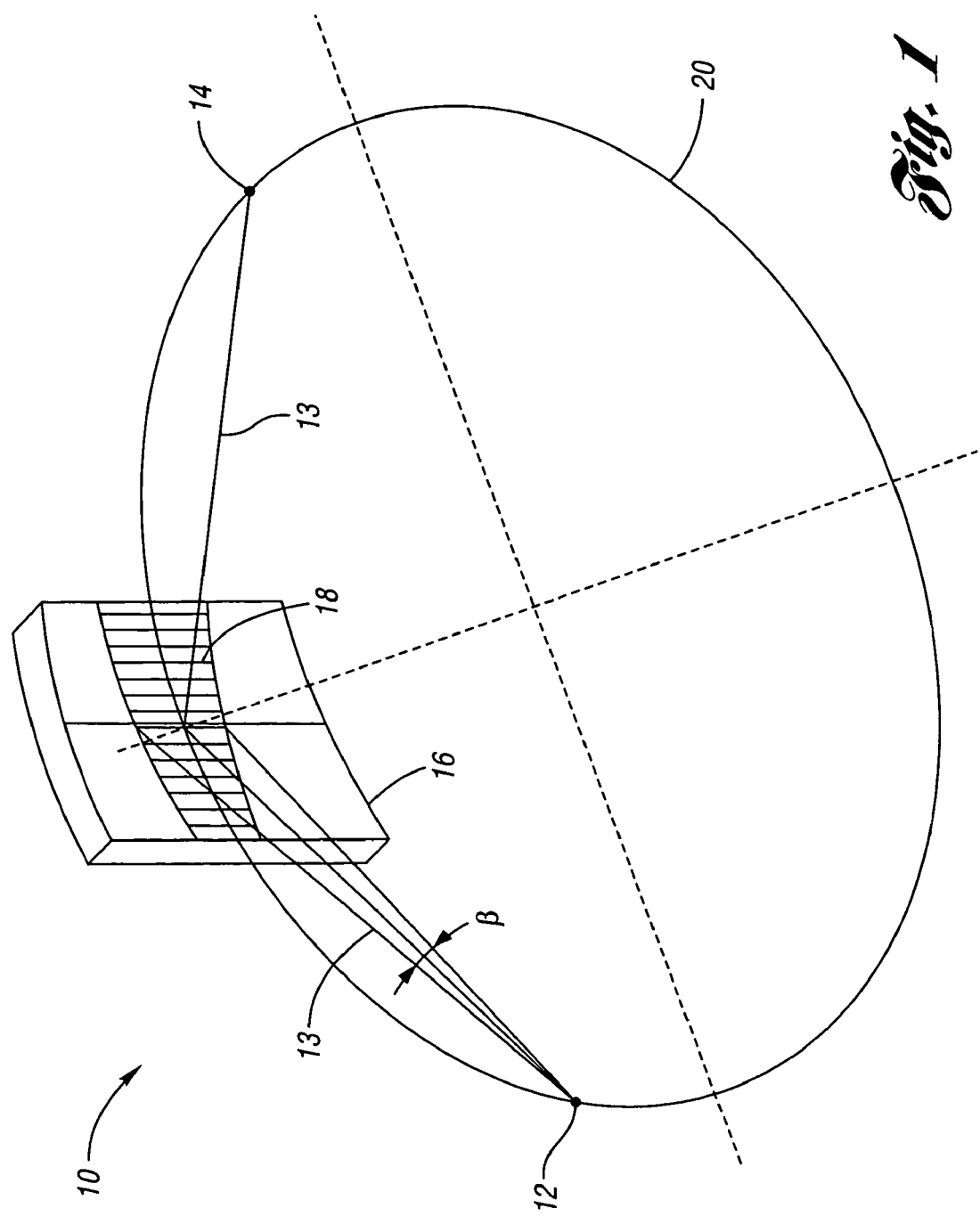
FIG. 1 is a diagrammatic view of a focusing diffractive element.

A single element optical system 10 shown in FIG. 1 includes a source 12 that emanates x-rays 13 towards an optical element 16, such as, for example, a Johansson crystal, a Johann crystal, or a logarithm spiral crystal. The optical element 16 diffracts the x-rays 13 to a focus 14. The source 12 and the focus 14 are located on a focusing circle 20.

A strip 18 on the optical element 16 defines an area within which the incident angle changes less than the half of the optical element rocking curve. The areas below and above this strip 18 do not reflect the beam effectively because a change of the incident angle is too large compared to the rocking curve. This angular acceptance of a diffractive element in the axial plane $\beta$ can be described as $$\beta = \left(\frac{\delta\theta}{\tan\theta}\right)^{\frac{1}{2}}. \quad (6)$$

Some other conditions, for instance, an aperture or an angular source distribution may limit the radiation usage in the axial plane. In such cases, $\beta$ is the smallest of the limitations.

The calculated efficiencies of various optical configurations and optical elements for both large and small focal spot of the sources (see, e.g., expressions 3 and 4) are shown below in Table 1. The configurations include a single optical element, a pair of similar optical elements in a side-by-side, confocal configuration (that is, a Kirkpatrick-Baez configuration), and a hybrid pair of optical elements including a multilayer and a crystal element in a side-by-side, confocal configuration.

The representative optical elements are a germanium Ge111 crystal, a multilayer with center d-spacing of 20 Angstroms, a lithium fluoride LiF200 crystal, and a pyrolitic graphite C0002 crystal as a single diffractive element. As indicated, pyrolitic graphite provides superior efficiency for both large and small sources, and the multilayer efficiency exceeds the efficiency of the Ge and LiF crystals when the source is large.

TABLE 1

EFFICIENCY OF OPTICAL CONFIGURATIONS

| Optical Configuration | Germanium | Multilayer | Lithium Fluoride | Pyrolitic Graphite |
|---|---|---|---|---|
| Large Source | | | | |
| Single Element | 1.3E−05 | 1.2E−04 | 3.5E−05 | 6.2E−03 |
| Standard Confocal Optic | 1.8E−13 | 8.1E−09 | 5.4E−12 | 2.9E−05 |
| Hybrid Confocal Optic | 2.0E−08 | | 1.1E−07 | 6.8E−06 |
| Small Source | | | | |
| Single Element | 4.8E−03 | 4.2E−03 | 3.6E−03 | 2.1E−02 |
| Standard Confocal Optic | 1.4E−06 | 5.3E−04 | 3.2E−06 | 1.9E−02 |
| Hybrid Confocal Optic | 6.9E−04 | | 1.1E−03 | 2.2E−−03 |

To calculate the efficiency of the confocal optical configuration, a capture angle in the diffraction plane for one element is considered the angle of axial acceptance for the second element. However, equation (6) for the angle of axial acceptance is not correct for the confocal arrangement, since it assumes that deviations not in the diffraction plane occur symmetrically in both directions, which is not the case in the confocal arrangement.

Figure 2:
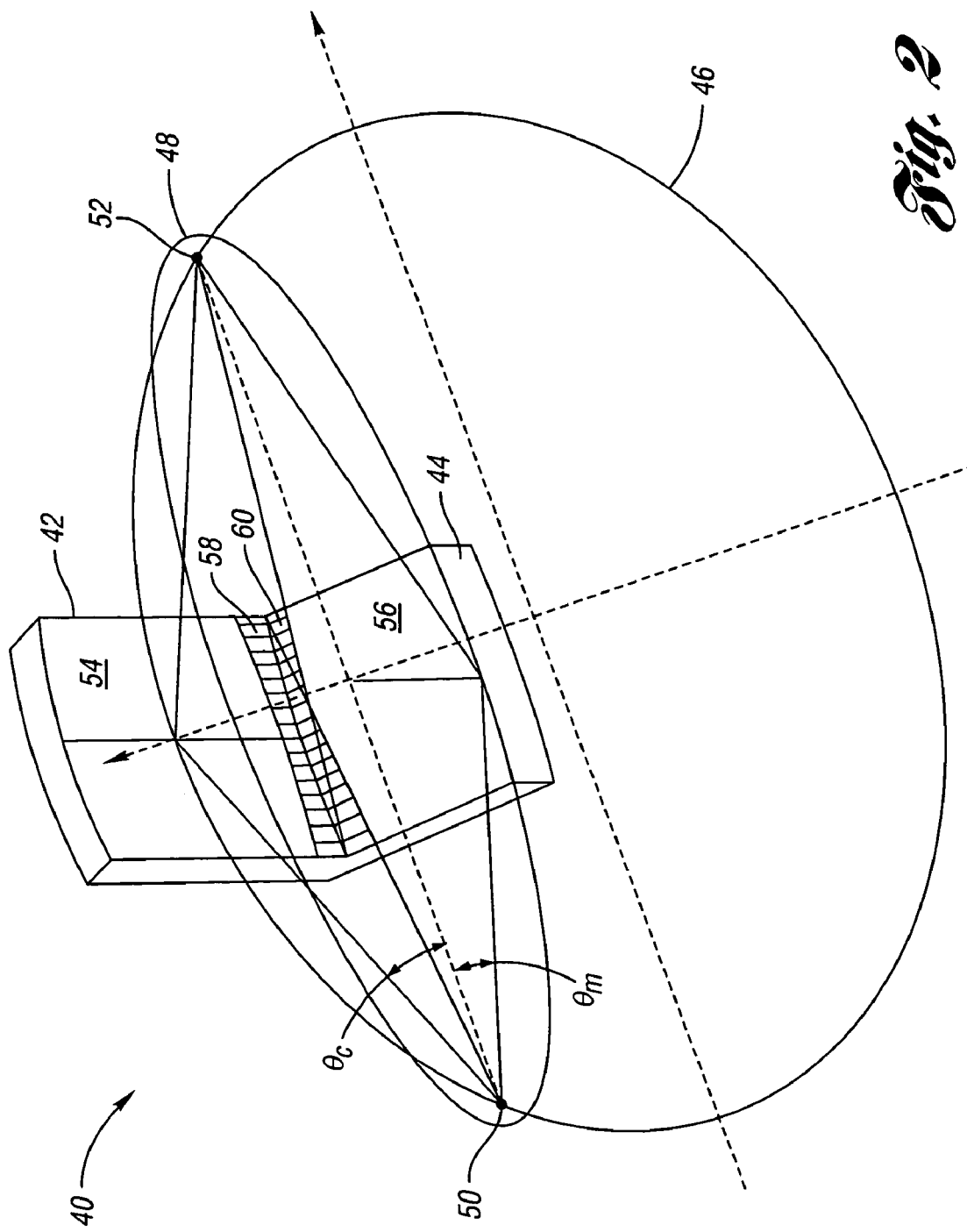
FIG. 2 is a diagrammatic view of two focusing diffractive elements in a Kirkpatrick-Baez side-by-side arrangement in accordance with the invention.

FIG. 2 is a diagrammatic view of a confocal (or Kirkpatrick-Baez) optical configuration 40 with a first optical element 42 and a second optical element 44 aligned in a side-by-side, orthogonal manner. The first optical element 42 defines a focusing circle 46 and the second optical element 44 defines a focusing ellipse 48. The first and second optical elements 42, 44 are aligned such that the focusing circle 46 intersects the focal points of the focusing ellipse 48 twice, once at the source 50 and once at the image position 52.

In one embodiment, the first optical element 42 is a crystal and the second optical element 44 is a multilayer optic.

Referring again to FIG. 2, the crystal working surface 54 is vertical and the multilayer working surface 56 is horizontal and positioned below the focusing circle 46. As shown, the crystal Bragg's angle $\theta_c$ defines the axial component of the incident angle of an x-ray from the focus to the mirror surface and vice versa. The cylindrical working surfaces of two optical elements cross, constructing the working corner of the optic, that is, the two strips 58 and 60 shown on the crystal working surface 54 and the multilayer working surface 56, respectively.

Note that the axial components for both optical elements are not symmetric with respect to their corresponding diffraction planes. To find the axial acceptance of a diffractive element in these conditions, expression (6) is re-written as:

$$\beta = \left(\frac{2\Delta\theta}{\tan\theta}\right)^{\frac{1}{2}} \tag{7}$$

or as:

$$\Delta\theta = \frac{\beta^2 \tan\theta}{2}. \tag{8}$$

In equations (7) and (8), $\beta$ is an angle between the ray and diffraction plane of an element and $\Delta\theta$ is the corresponding deviation of the incident angle from Bragg's angle. To determine the strength of the incident angle change $d(\Delta\theta)$ caused by a small variation of axial angle $d\beta$, equation (8) is differentiated, yielding:

$$d(\Delta\theta) = \beta \cdot \tan\theta \cdot d\beta. \tag{9}$$

If $d(\Delta\theta) = \delta\theta$ is an element angular acceptance in its diffraction plane, than its axial acceptance at an average axial angle $\beta$ is:

$$d\beta = \frac{\delta\theta}{\beta \tan\theta}. \tag{10}$$

In a confocal optic arrangement the crystal axial angle $\beta_c$ is defined through the mirror Bragg's angle $\theta_m$ as:

$$\beta_c = \arctan(\tan\theta_m \cdot \cos\theta_c), \text{ and} \tag{11}$$

$$\beta_m = \arctan(\tan\theta_c \cdot \cos\theta_m) \tag{12}$$

where $\theta_m$ and $\theta_c$ are Bragg's angles of the mirror and crystal, respectively. Since the confocal optic acceptance angle in a vertical plane is defined by the mirror capture angle and the crystal axial acceptance angle, the smaller of these two angles is employed for the efficiency calculations. The efficiency of a confocal optic based on similar or different elements in two diffraction perpendicular planes can be calculated on the basis of the above equations.

The results of such calculations are also presented in Table 1. Again, it is seen that graphite provides the highest efficiency. However, a nontrivial result of these calculations is that the hybrid optic including a multilayer and either a perfect crystal (Ge) or a mosaic crystal (LiF) provides higher efficiency than a pure confocal optic having two similar components in two planes.

For instance, with a large source, a Ge confocal optic has an efficiency of 1.8E-13, compared to an efficiency of 8.1E-9 for a multilayer optic. However, a hybrid optic with a multilayer in one plane and Ge in another plane provides an efficiency of 2.0E-8. This latter configuration is of a special interest because optics based on a multilayer and a Ge crystal can provide precise focusing and high efficiency.

The following, among others, are examples of combinations of diffractive elements that provide a high efficiency in the confocal arrangement: two mosaic crystals with a low d-spacing and high mosaicity; a multilayer mirror and a mosaic or a perfect crystal with a low d-spacing; and a mosaic crystal with a high d-spacing with a mosaic or a perfect crystal with low d-spacing.

The definitions of low/high d-spacing and low/high mosaicity depend on the particular requirements of the collimated beam. For example, d-spacing above about 10 Angstroms and mosaicity more than about 5 to 10 arcminutes may be considered high d-spacing and high mosaicity, respectively.

A confocal optic including a Johansson crystal and an elliptical multilayer mirror with laterally graded d-spacing and depth grading is one preferred configuration. This type of optic is an effective diffractive component to form a convergent focusing beam. One particularly effective implementation of hybrid confocal multilayer/crystal optic is when a highly convergence beam in one plane is desired, for example, for high convergence beam reflectometry.

A parabolic multilayer mirror with laterally graded d-spacing and depth grading is an optimal diffractive element to form a parallel beam. A highly asymmetric Johansson crystal may be used to form a quasi parallel beam when the requirements of beam divergence in one plane are stricter than that in the other plane. Again, various embodiments of the present invention can utilize many other diffractive optical components to form a quasi parallel beam.

The lengths and center positions of two diffractive elements may coincide, or they may be different. Thus, some areas of two diffractive elements are overlapped, creating a side-by-side, confocal optic, in accordance with an embodiment of the present invention.

The hybrid confocal optic of the present invention may include two, four or multiple working corners, as described in U.S. Pat. No. 6,014,423, the contents of which is incorporated herein by reference in its entirety.

Certain implementations of the x-ray optical system of the present invention may include entrance and exit apertures to clean the x-ray beam and to simplify x-ray shielding.

Figure 3:
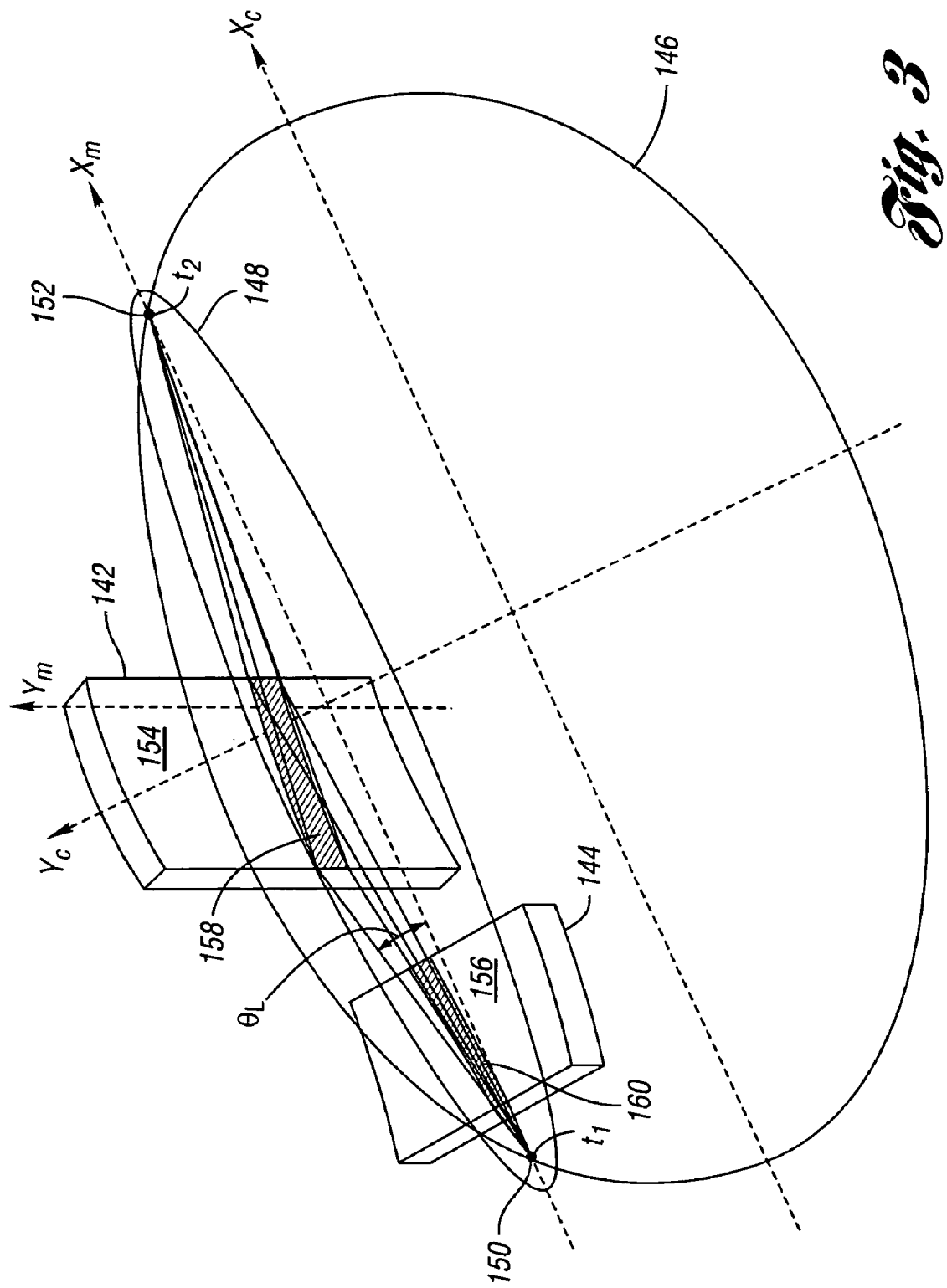
FIG. 3 is a diagrammatic view of two focusing diffractive elements configured in a sequential arrangement in accordance with another embodiment of the invention.

Referring to FIG. 3, there is shown another embodiment of an optical configuration 100 with a first optical element 142 and a second optical element 144 aligned in a sequential, orthogonal manner. The first optical element 142 defines a focusing circle 146 and the second optical element 144 defines a focusing ellipse 148. The first and second optical elements 142, 144 are aligned such that the focusing circle 146 intersects the focal points of the focusing ellipse 148 twice, once at the source 150 and once at the image position 152 (that is, the optic focus).

In one embodiment, the first optical element 142 is a crystal and the second optical element 144 is a mirror, such as a multilayer optic. The crystal working surface 154 is vertical and the multilayer working surface 156 is horizontal and positioned below the focusing circle 146. As shown, the crystal's Bragg angle $\theta_c$ defines the axial component of the incident angle of an x-ray from the focus to the mirror surface and vice versa. The cylindrical working surfaces of two optical elements cross, constructing the working corner of the optic, that is, the two strips 158 and 160 shown on the crystal working surface 154 and the mirror working surface 156, respectively.

The sequential optical configuration 100 provides flexibility with optical system performances. In the implementation shown in FIG. 3, the mirror 144 is closer to the source 150 than the crystal 142, which provides a higher system efficiency. In another implementation, the mirror 144 is closer to the optic focus 152, which provides for small focus when desired. The position of the crystal 142 along its focusing circle 146 does not change its efficiency and focusing performance. In a particular implementation, the crystal 142 is centered relative to the source 150 and the optic focus 152 to minimize potential aberrations caused by the curvatures of the mirror 144 and the crystal 142.

Further, the sequential optical configuration 100 provides a higher efficiency, as compared to the side-by-side arrangement, because of a smaller loss of efficiency resulting from axial (out of diffraction plane) components of the incident rays, since each optical element 142, 144 has a single reflection zone, such that axial deviations can be compensated by the Bragg adjustment. This is not possible in the side-by-side arrangement, since each optical element has two reflection zones with opposite directions of axial components, so that the adjustment in the diffraction plane can not compensate for deviations from the Bragg angle.

Depending upon the implementation of the optical configuration 100, any of the features of the optical elements and combinations of optical elements for the configuration 40 may apply as well to the optical elements 142, 144.

It should be apparent to those skilled in the art that the above-described embodiment is merely illustrative of but a few of the many possible specific embodiments of the present invention. Numerous and various other arrangements can be readily devised by those skilled in the art without departing from the spirit and scope of the invention as defined in the following claims.

What is claimed is:

1. An x-ray beam conditioning system comprising:
   a sequential optic including
   a first diffractive element, and
   a second diffractive element,
   at least one diffractive element of the first and second diffractive elements being a crystal, and
   at least one diffractive element of the first and second diffractive elements having curved diffracting planes with at least one focus point.

2. The x-ray beam conditioning system of claim 1 wherein both diffractive elements are mosaic crystals with high mosaicity end low d-spacing.

3. The x-ray beam directing system of claim 1 wherein the crystal is selected from the group consisting of a perfect crystal and a mosaic crystal and has a low d-spacing.

4. The x-ray beam conditioning system of claim 3 wherein the other diffractive element is a multilayer optic.

5. The x-ray beam conditioning system of claim 3 wherein the other diffractive element is a mosaic crystal with large d-spacing.

6. The x-ray beam conditioning system of claim 1 wherein the diffractive element is a multilayer optic selected from the group consisting of an elliptical mirror and a parabolic mirror and has graded d-spacing.

7. The x-ray beam conditioning system of claim 6 wherein the graded d-spacing is lateral grading.

8. The x-ray beam conditioning system of claim 6 wherein the graded d-spacing is depth grading.

9. The x-ray beam conditioning system of claim 6 wherein the graded d-spacing is lateral grading and depth grading.

10. The x-ray beam conditioning system 1 wherein at least one diffractive element is an asymmetric Johansson crystal.

11. The x-ray beam conditioning system of claim 1 wherein at least one diffractive element is a Johansson crystal, a Johann crystal, or a logarithm crystal.

12. The x-ray beam conditioning system 1 wherein at least one diffractive element is a crystal with low d-spacing for use in a plane where high convergence is provided.

13. The x-ray beam conditioning system of claim 1 further comprising at least two working corners.

* * * * *